(12) United States Patent
Watanabe et al.

(10) Patent No.: US 11,279,235 B2
(45) Date of Patent: Mar. 22, 2022

(54) TERMINAL DEVICE, CENTRAL DEVICE, TRAIN INFORMATION MANAGEMENT SYSTEM, AND TRAIN INFORMATION MANAGEMENT METHOD

(71) Applicant: Mitsubishi Electric Corporation, Tokyo (JP)

(72) Inventors: Ryoichi Watanabe, Tokyo (JP); Tomoyuki Hirata, Tokyo (JP); Tomoaki Ikejima, Tokyo (JP); Hiromi Goda, Tokyo (JP); Shogo Tatsumi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 221 days.

(21) Appl. No.: 16/320,727

(22) PCT Filed: Sep. 23, 2016

(86) PCT No.: PCT/JP2016/078043
§ 371 (c)(1),
(2) Date: Jan. 25, 2019

(87) PCT Pub. No.: WO2018/055732
PCT Pub. Date: Mar. 29, 2018

(65) Prior Publication Data
US 2019/0202485 A1 Jul. 4, 2019

(51) Int. Cl.
*B60L 3/00* (2019.01)
*B61L 15/00* (2006.01)
(Continued)

(52) U.S. Cl.
CPC ............... *B60L 3/0084* (2013.01); *B60L 3/00* (2013.01); *B60L 15/42* (2013.01);
(Continued)

(58) Field of Classification Search
CPC .......................... B61L 15/0018; B61L 15/0072
See application file for complete search history.

(56) References Cited

U.S. PATENT DOCUMENTS

2009/0044041 A1* 2/2009 Armbruster ....... H04L 12/40189
714/3
2012/0117288 A1* 5/2012 Katogi .................. G06F 13/364
710/114
(Continued)

FOREIGN PATENT DOCUMENTS

JP 4966888 B2 7/2012

OTHER PUBLICATIONS

International Search Report (PCT/ISA/210) dated Dec. 20, 2016, by the Japan Patent Office as the International Searching Authority for International Application No. PCT/JP2016/078043.
(Continued)

*Primary Examiner* — Imran K Mustafa
(74) *Attorney, Agent, or Firm* — Buchanan Ingersoll & Rooney PC

(57) ABSTRACT

A terminal device which receives command information from a central device in a train information management system, includes a transmission-reception unit which transmits and receives the command information to and from the central device or other terminal device and periodically receives command information from a plurality of central devices, a control unit which determines whether or not management information, which is information on a train composition set by a central device which is a transmission source, regarding the received command information, is normal command information and determines command information to be adopted based on a priority set to the central device which is the transmission source when receiving the normal command information from the plurality of
(Continued)

central devices, and a storage unit which stores information on the priorities set to the plurality of central devices.

10 Claims, 6 Drawing Sheets

(51) Int. Cl.
    *B61L 27/00*     (2006.01)
    *B60L 15/42*     (2006.01)

(52) U.S. Cl.
    CPC ....... *B61L 15/0018* (2013.01); *B61L 15/0036* (2013.01); *B61L 15/0072* (2013.01); *B61L 27/0072* (2013.01); *B60L 2200/26* (2013.01); *Y02T 90/16* (2013.01)

(56) References Cited

U.S. PATENT DOCUMENTS

2013/0261842 A1* 10/2013 Cooper ............... B61L 15/0036
    701/1
2014/0376554 A1* 12/2014 Komura ................ H04L 67/125
    370/394

OTHER PUBLICATIONS

Written Opinion (PCT/ISA/237) dated Dec. 20, 2016, by the Japan Patent Office as the International Searching Authority for International Application No. PCT/JP2016/078043.

* cited by examiner

TERMINAL DEVICE, CENTRAL DEVICE, TRAIN INFORMATION MANAGEMENT SYSTEM, AND TRAIN INFORMATION MANAGEMENT METHOD

FIELD

The present invention relates to a terminal device for communicating with a central device in a train information management system, the central device, the train information management system, and a train information management method.

BACKGROUND

In a train information management system, central devices are mounted on a leading car and a last car of a train and transmit command information to terminal devices mounted on intermediate cars of the train. Some train information management systems include two systems. In the train information management system including the two systems, two central devices are mounted on a single car, and one of the central devices is operated as a main system, that is, a central device with a higher priority. Patent Literature 1 discloses a technique for exchanging an excitation signal between two central devices and for determining whether the other central device is normal or abnormal.

CITATION LIST

Patent Literature

Patent Literature 1: Japanese Patent No. 4966888

SUMMARY

Technical Problem

However, according to the conventional technique, in a case where the central device with the higher priority is reset and restarted due to time-up of a watchdog timer and the like, there is a possibility that a setting content is initialized and the central device transmits command information to which management information is not set, that is, including invalid management information to a train. Therefore, there has been a problem in that, even though a terminal device which has received the command information including the invalid management information holds normal management information based on command information received in the past, the held management information is updated, that is, initialized, and a normal train operation cannot be continued.

The present invention has been made in consideration of the above, and an object of the present invention is to obtain a terminal device capable of continuing a normal train operation even in a case where there is a central device that transmits command information including invalid management information.

Solution to Problem

To solve the above problems and to achieve the object, the present invention is a terminal device which receives command information from a central device in a train information management system. The terminal device includes a transmission-reception unit which transmits and receives command information to and from the central device or other terminal device and periodically receives command information from a plurality of central devices. Furthermore, the terminal device includes a control unit which determines whether or not management information as information on a train composition set by a central device as a transmission source regarding the received command information, is normal command information. The control unit also determines command information to be adopted based on a priority set to the central device as the transmission source in a case where the normal command information has been received from the plurality of central devices. The terminal device includes a storage unit which stores information on the priorities set to the plurality of central devices.

Advantageous Effects of Invention

According to the present invention, an effect can be obtained such that, even in a case where there is a central device which transmits command information including invalid management information, a terminal device can continue a normal train operation.

DESCRIPTION OF EMBODIMENTS

Hereinafter, a terminal device, a central device, a train information management system, and a train information management method according to an embodiment of the present invention will be described in detail with reference to the drawings. The present invention is not limited to the embodiments.

Embodiment

Figure 1:
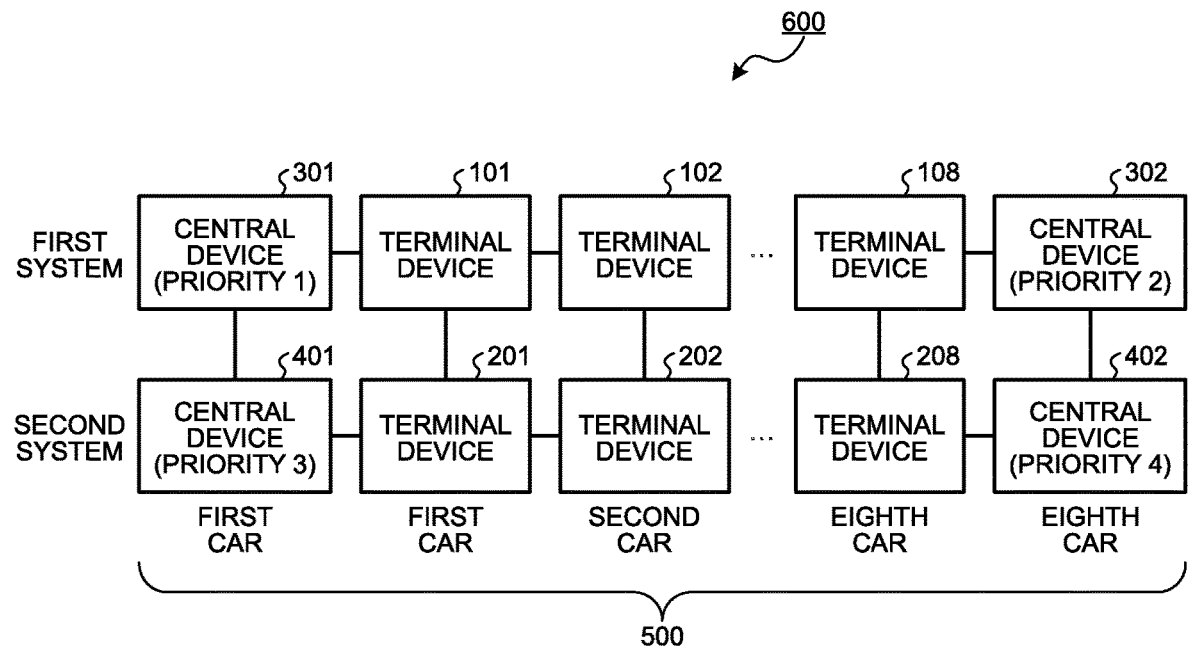
FIG. 1 is a diagram illustrating an exemplary configuration of a train information management system.

FIG. 1 is a diagram illustrating an exemplary configuration of a train information management system 600 according to an embodiment of the present invention. The train information management system 600 includes: terminal devices 101 to 108 and 201 to 208; and central devices 301, 302, 401, and 402. In FIG. 1, the train information management system 600 manages a train composition 500 including eight cars, i.e., a first car to an eighth car. The train information management system 600 includes two systems, and two terminal devices being the same number as the systems are mounted on each car, and two central devices being the same number as the systems are mounted on a leading car and a last car. Here, for convenience, the first car is assumed as the leading car, and the eighth car is assumed as the last car. A system including the terminal devices 101 to 108 and the central devices 301 and 302 is a first system which is a master, and a system including the terminal devices 201 to 208 and the central devices 401 and 402 is a second system which is a slave. The train information management system 600 operates train information management by the terminal devices 101 to 108 and the central devices 301 and 302 in the first system in a state where each device is normally operated. Note that the terminal devices may be mounted only on intermediate cars without mounting on the leading car and the last car.

In the train information management system 600, the central devices 301, 302, 401 and 402: transmit control information concerning devices, which are connected to the terminal devices 101 to 108 and 201 to 208 and are not illustrated, to the terminal devices 101 to 108 and 201 to 208; and controls an operation of a device provided in each car, for example, an air conditioner.

Generally, in the train information management system, the central device periodically transmits command information including management information such as a train number for identifying each train composition in a current operation form and a mileage indicating a train position of the current train composition to each terminal device. In the train information management system in which the plurality of central devices are mounted on the train composition, a priority is set to each central device, and the central device with the highest priority transmits the command information to each terminal device. In such a train information management system, in a case where the central device with the highest priority cannot transmit the command information due to a failure and the like, the central device having the next highest priority transmits the command information to each terminal device. Therefore, in a case where the central device with the highest priority is reset and restarted, a failure described at "Technical Problem" in the present description may occur.

According to the present embodiment, in the train information management system 600, each of the central devices 301, 302, 401 and 402 periodically generates and transmits the command information. In the train information management system 600, the terminal devices 101 to 108 and 201 to 208 receive the command information from the central devices 301, 302, 401 and 402. The terminal devices 101 to 108 and 201 to 208 determine whether the command information received from the central devices 301, 302, 401 and 402 is normal command information or abnormal command information. When there are a plurality of pieces of normal command information, command information to be adopted is determined based on the priorities set to the central devices 301, 302, 401 and 402. Similarly, the central devices 301, 302, 401 and 402 receive command information from other central devices. The central devices 301, 302, 401 and 402 determine whether the command information generated by the central devices and the command information received from the other central devices are normal command information or abnormal command. When there are a plurality of pieces of normal command information, command information to be adopted is determined based on the priorities set to the central devices 301, 302, 401 and 402. That is, in the train information management system 600, the terminal devices 101 to 108 and 201 to 208 and the central devices 301, 302, 401 and 402 which have received the command information determine the command information to be adopted.

Figure 2:
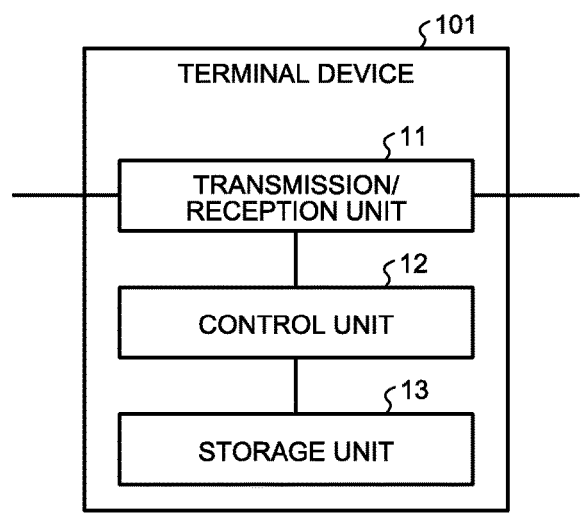
FIG. 2 is a block diagram illustrating an exemplary configuration of a terminal device.

Next, a configuration of each device will be described. First, configurations of the terminal devices 101 to 108 and 201 to 208 will be described. FIG. 2 is a block diagram illustrating an exemplary configuration of the terminal device 101 according to the present embodiment. Since the terminal devices 101 to 108 and 201 to 208 have similar configurations in the train information management system 600, the terminal device 101 will be described as an example. The terminal device 101 includes a transmission-reception unit 11, a control unit 12, and a storage unit 13. In FIG. 2, components necessary for describing an operation of the present embodiment are illustrated, and description of general components of the terminal device 101 is omitted.

The transmission-reception unit 11 transmits and receives the command information to and from the central device 301 and the terminal device 102. When receiving the command information generated by the central devices 301 and 401 from the central device 301, the transmission-reception unit 11 notifies the control unit 12 of the content of the command information and transfers the command information to the terminal device 102 of the adjacent car. Furthermore, when receiving the command information generated by the central devices 302 and 402 from the terminal device 102 of the adjacent car, the transmission-reception unit 11 notifies the control unit 12 of the content of the command information and transfers the command information to the central device 301. Furthermore, the transmission-reception unit 11 communicates with the other terminal device 201 mounted on the same car which is the first car. The transmission-reception unit 11 periodically receives the command information transmitted from the central devices 301, 302, 401 and 402.

When the content of the command information transmitted from each of the central devices 301, 302, 401 and 402 is notified from the transmission-reception unit 11, the control unit 12 determines whether each command information is normal command information or abnormal command information. For example, in a case where items of the train number and the mileage are included in the command information as the management information as described above, the control unit 12 determines that the command information to which the values of the train number and the mileage are set is normal command information and that the command information which cannot be determined as normal command information is abnormal command information. The abnormal command information is command information to which one or both of the values of the train number and the mileage is not set. In a case where only one of the train number or the mileage is set to the command information as the management information, the control unit 12 may make determination based on only one of the train number or the mileage.

Furthermore, in a case where there are the plurality of pieces of normal command information, the control unit 12 adopts normal command information transmitted from the central device with the highest priority based on the priority set to each central device which is a transmission source of the normal command information. It is assumed that information for identifying the central device which is the transmission source is included in the command information. The information for identifying the central device which is the transmission source is, for example, an address specific to each central device. The control unit 12: refers to the priorities set to the central devices 301, 302, 401 and 402 and stored in the storage unit 13; and obtains information on the priority set to each central device which is the transmission source of the normal command information. The control unit 12 determines the command information to be adopted by similar processing each time when the command information is periodically transmitted from each central device. As far as the command information transmitted from the central device with the highest priority is normal command information, the control unit 12 continuously adopts the command information transmitted from the central device with the highest priority. The control unit 12 discards the command information which has not been adopted. In the example in FIG. 1, the central device 301 has the highest priority, and the central devices 302 and 401 have higher priorities in this order, and the central device 402 has the lowest priority.

Furthermore, in a case where determining that the received command information is abnormal command information, thereafter, the control unit 12 excludes the command information sent from the central device which has transmitted the abnormal command information from adoption candidates. It is considered that the central device which once has transmitted the abnormal command information may transmit abnormal command information in the future. Therefore, the control unit 12 can reduce a processing load when the command information is adopted by excluding the command information sent from the central device which has transmitted the abnormal command information from the adoption candidates in the future. In a case where the command information transmitted from all the central devices 301, 302, 401 and 402 has been determined as abnormal command information and the command information from all the central devices 301, 302, 401 and 402 has been excluded from the adoption candidates, the control unit 12 cannot adopt command information. In such a case, the control unit 12 expects that some central devices have returned to a normal operation and can transmit normal command information, and the control unit 12 cancels exclusion from the adoption candidate and assumes the command information from all the central devices as the adoption candidate.

In a case where the cars are divided in the train composition 500 including the terminal device 101 or where the other train composition is joined to the train composition 500, the control unit 12 cancels the exclusion of the central device, which is the transmission source of the command information and is excluded from the adoption candidate. The cancelation is conducted because the number of central devices for transmitting the command information is different from that before the cars are divided or joined.

Figure 3:
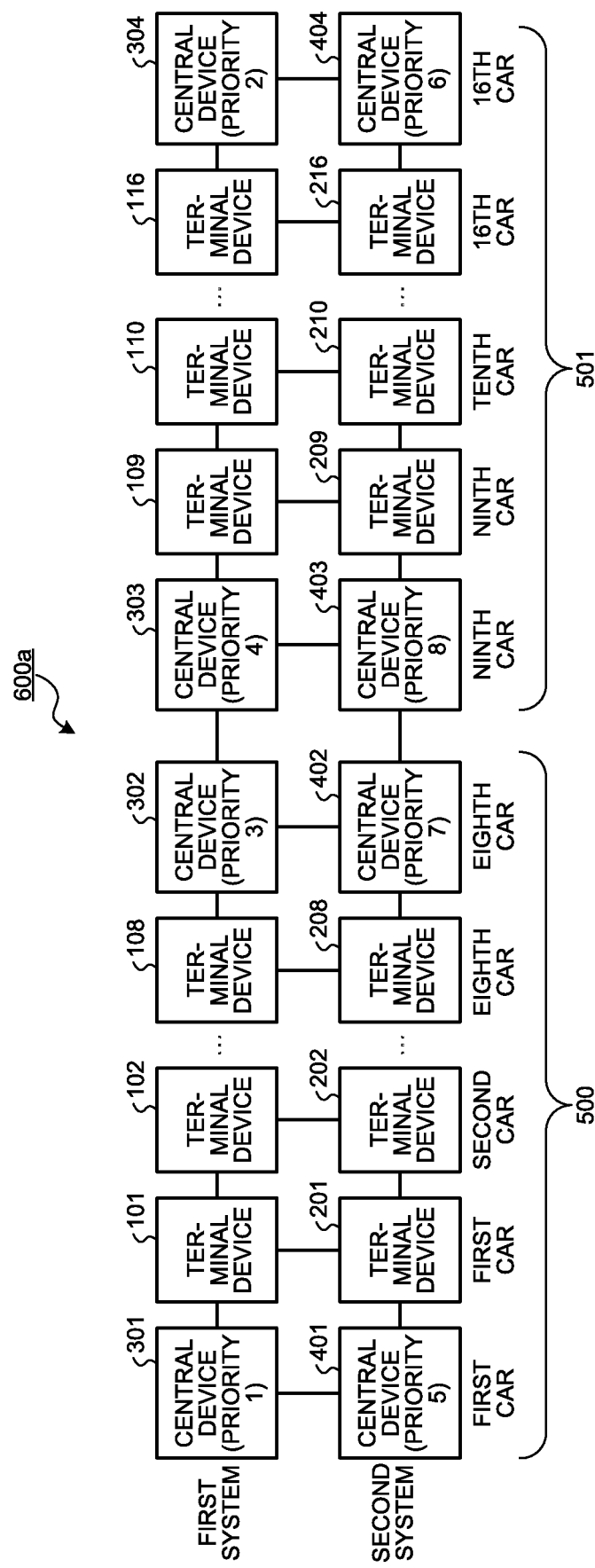
FIG. 3 is a diagram illustrating an exemplary configuration of another train information management system.

FIG. 3 is a diagram illustrating an exemplary configuration of another train information management system 600a according to the present embodiment. In the train information management system 600a, a train composition 501 having similar formation to the train composition 500 is joined to the train composition 500. Configurations of terminal devices 109 to 116 and 209 to 216 are similar to the configurations of the terminal devices 101 to 108 and 201 to 208. Configurations of central devices 303, 304, 403, and 404 are similar to the configurations of the central devices 301, 302, 401 and 402. In the train information management system 600a, priorities are set to the central devices 301 to 304 and 401 to 404 in a state where the train compositions 500 and 501 are joined to each other. Here, for convenience, the first car is assumed as the leading car, and the 16th car is assumed as the last car. Similarly to the train information management system 600 illustrated in FIG. 1, the priorities of the central devices of the leading car and the last car of the train are high. Therefore, the priorities of the central devices 302 and 402 which are changed to intermediate cars are lower than those in the train information management system 600.

The storage unit 13 stores information on the priority set to each of the central devices 301, 302, 401 and 402. The information on the priority may be stored by setting each terminal device by an administrator of the system before the train information management system 600 or the train information management system 600a is operated, or may be stored by being distributed from a system on a ground side via the central device. Furthermore, the storage unit 13 holds the management information included in the adopted command information, that is, the information such as a train number and a mileage under control of the control unit 12.

Figure 4:
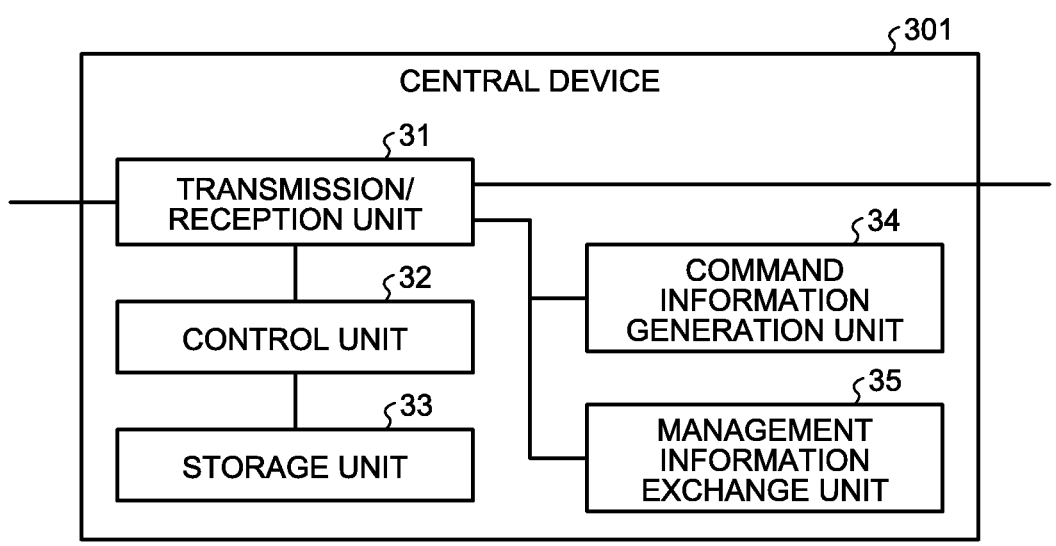
FIG. 4 is a block diagram illustrating an exemplary configuration of a central device.

Next, the configurations of the central devices 301 to 304 and 401 to 404 will be described. FIG. 4 is a block diagram illustrating an exemplary configuration of the central device 301 according to the present embodiment. Since the configurations of the central devices 301 to 304 and 401 to 404 are similar to each other in the train information management system 600 and the train information management system 600a, the central device 301 will be described as an example. The central device 301 includes a transmission-reception unit 31, a control unit 32, a storage unit 33, a command information generation unit 34, and a management information exchange unit 35. In FIG. 4, components necessary for describing an operation of the present embodiment are illustrated, and description of general components of the central device 301 is omitted.

The transmission-reception unit 31 transmits and receives the command information to and from the central device 401 and the terminal device 101. The transmission-reception unit 31 transfers the command information generated by the command information generation unit 34 of the central device 301 to the central device 401 and the terminal device 101 and notifies the control unit 32 of the command information. Furthermore, when receiving the command information generated by the central device 401 from the central device 401, the transmission-reception unit 31 notifies the control unit 32 of the content of the command information and transfers the command information to the terminal device 101 of the adjacent car. Furthermore, when receiving the command information generated by the central devices 302 and 402 from the terminal device 101 of the adjacent car, the transmission-reception unit 31 notifies the control unit 32 of the content of the command information and transfers the command information to the central device 401. The transmission-reception unit 31 periodically receives the command information transmitted from the central devices 302, 401, and 402 and periodically obtains the command information generated by the command information generation unit 34 of the central device 301.

The control unit 32 and the storage unit 33 respectively have functions similar to the functions of the control unit 12 and the storage unit 13 of the terminal device 101 described above.

The command information generation unit 34 periodically generates the command information to which the train number and the mileage are set as the management information. The command information generation unit 34 outputs the generated command information to the transmission-reception unit 31.

The management information exchange unit 35 exchanges the management information to be set to the command information with the other central device 401 of the first car which is the same car. The management information exchange unit 35 exchanges the management information with the management information exchange unit 35 of the central device 401 via the transmission-reception unit 31 and notifies the command information generation unit 34 of the management information obtained from the central device 401.

The command information generation unit 34 obtains the management information of the central device 401 from the management information exchange unit 35. In a case where an abnormality occurs in the management information set to the command information by the central device 301, the command information generation unit 34 generates the command information by using the management information obtained by the management information exchange unit 35. In a case where an abnormality occurs in the management information set to the command information by the command information generation unit 34 and a request is issued from the command information generation unit 34, in the central device 301, the management information exchange unit 35 may exchange the management information set to the command information with the central device 401.

Figure 5:
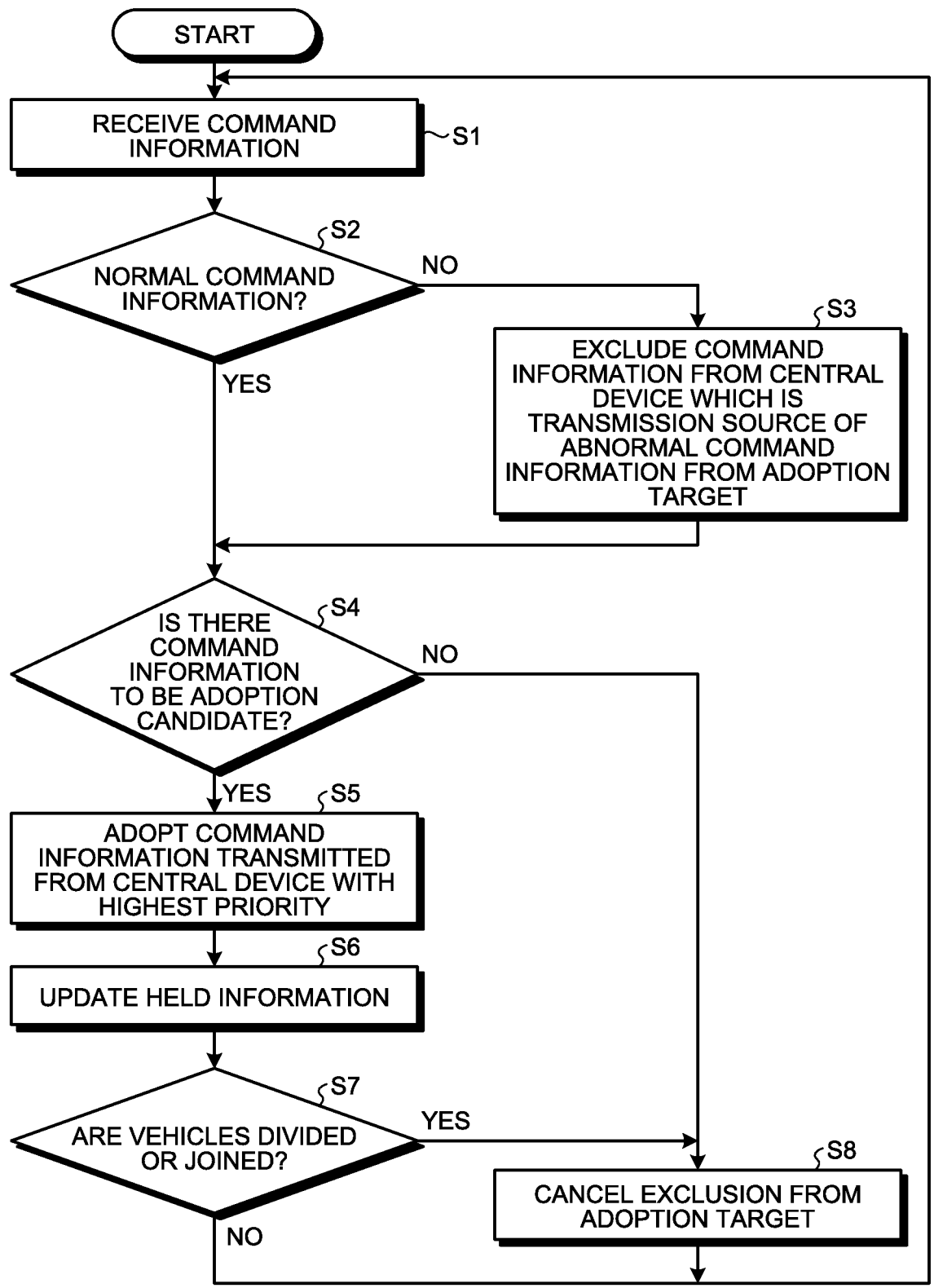
FIG. 5 is a flowchart illustrating processing for determining command information to be adopted in a case where the terminal device receives a plurality of pieces of command information.

Subsequently, processing for determining the command information to be adopted in a case where the terminal devices 101 to 116 and 201 to 216 and the central devices 301 to 304 and 401 to 404 receive the command information from a plurality of central devices will be described. Since the processing for determining the command information to be adopted are similar to each other in all the above devices, here, the terminal device 101 in the train information management system 600 illustrated in FIG. 1 will be described as an example. FIG. 5 is a flowchart illustrating processing for determining the command information to be adopted in a case where the terminal device 101 receives the plurality of pieces of command information according to the present embodiment.

First, in the terminal device 101, the transmission-reception unit 11 receives the command information from the plurality of central devices 301, 302, 401 and 402 (step S1). The transmission-reception unit 11 notifies the control unit 12 of a content of the received command information.

The control unit 12 determines whether or not each notified command information is normal command information (step S2). As described above, the control unit 12 determines the command information to which the train number or the mileage, or the train number and the mileage are set as the management information as the normal command information (step S2: Yes). The control unit 12 determines the command information which is not determined as the normal command information such as a case where the train number or the mileage is not set as abnormal command information (step S2: No). In the subsequent processing, the control unit 12 excludes the command information sent from the central device which is the transmission source of the abnormal command information from the adoption candidates (step S3).

The control unit 12 confirms whether there is normal command information, that is, command information to be an adoption candidate (step S4). In a case where there is a candidate of the command information to be adopted (step S4: Yes), the control unit 12 refers to the storage unit 13, confirms the priority of the central device which is the transmission source of the command information to be a candidate to be adopted, and adopts the command information transmitted from the central device with the highest priority (step S5). The control unit 12 updates the information on the train number and the mileage held by the storage unit 13 based on the information on the train number and the mileage which are management information included in the adopted command information (step S6).

The control unit 12 determines whether the cars are divided or joined in the train composition 500 based on the number of pieces of received command information notified from the transmission-reception unit 11 (step S7). In a case where the cars are not divided or joined (step S7: No), the terminal device 101 returns to the processing in step S1 and repeats the processing.

In a case where there is no candidate of the command information to be adopted (step S4: No), the control unit 12 cancels the exclusion from the adoption candidate and assumes the command information from all the central devices as the adoption candidates (step S8). Furthermore, in a case where the cars are divided or joined in the train composition 500 (step S7: Yes), the control unit 12 cancels the exclusion of the central device, which are excluded from the adoption candidate, from the adoption candidate. Thus, the control unit 12 assumes the command information sent from all the central devices as the adoption candidate (step S8). Thereafter, the terminal device 101 returns to the processing in step S1 and repeats the processing.

Figure 6:
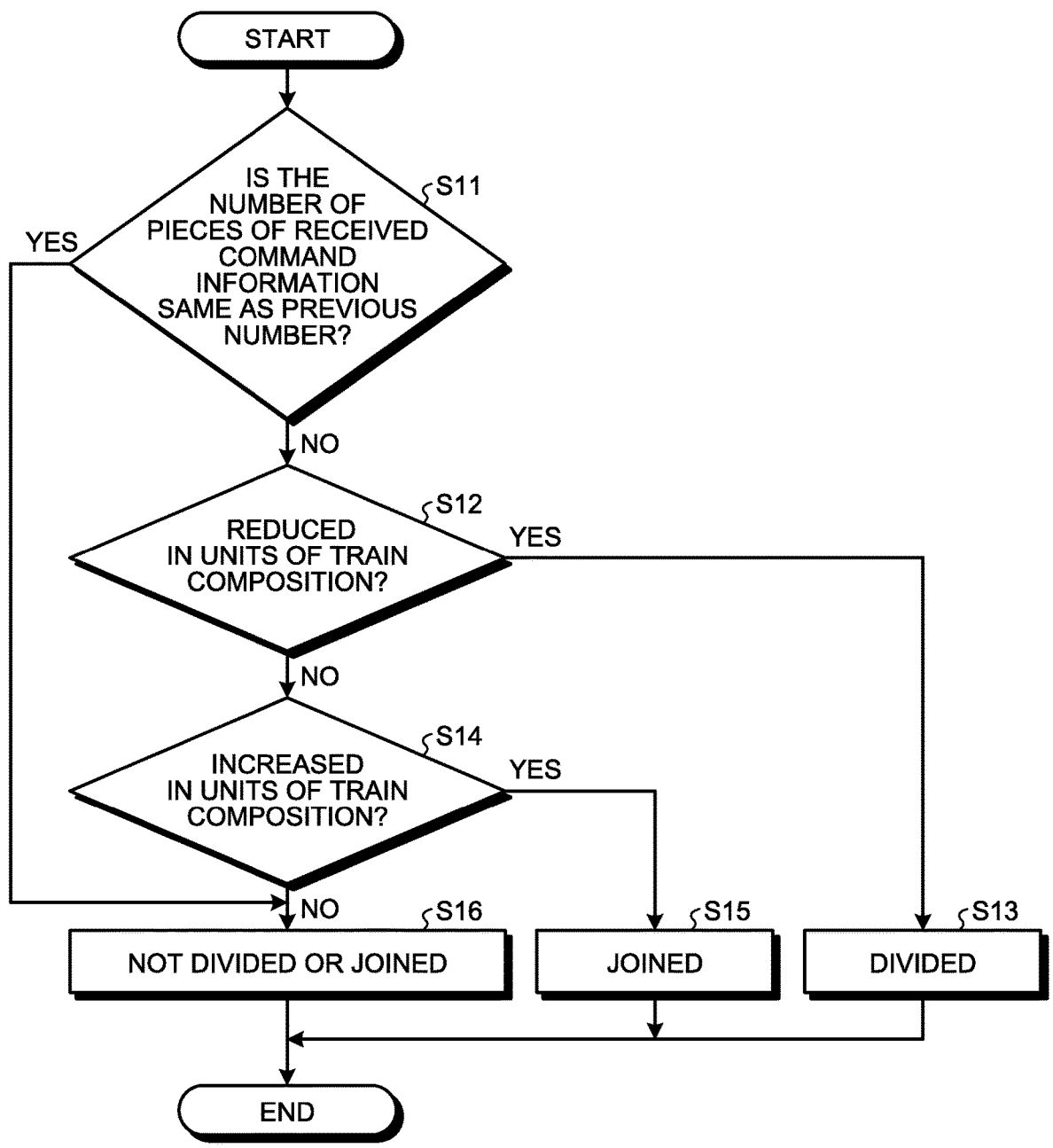
FIG. 6 is a flowchart illustrating processing for determining by the terminal device whether or not cars are divided or joined in a train composition.

FIG. 6 is a flowchart illustrating processing for determining whether or not the cars are divided or joined in the train composition 500 by the terminal device 101 according to the present embodiment.

The control unit 12 determines whether or not the number of pieces of command information notified from the transmission-reception unit 11, that is, the number of pieces of command information received by the terminal device 101 are the same as the previous number (step S11). In a case where the number of pieces of command information received by the terminal device 101 is different from the previous number (step S11: No), the control unit 12 confirms whether the number of pieces of command information is reduced in units of train composition (step S12).

Here, as illustrated in FIGS. 1 and 3, each of the train compositions 500 and 501 including the first and second systems has four central devices mounted therein. Furthermore, the central devices are mounted on the leading car and the last car of each of the train compositions 500 and 501. The unit of the train composition is a multiple of four which is the number of central devices mounted on each train composition or a multiple of two which is the number of central devices mounted on the leading car or the last car. In a case where the number of pieces of command information is reduced in units of train composition (step S12: Yes), the control unit 12 determines that the cars are divided in the train composition 500 (step S13).

In a case where the number of pieces of command information is increased in units of train composition (step S14: Yes) although the number of pieces of command information is reduced in units of train composition (step S12: No), the control unit 12 determines that the cars are joined in the train composition 500 (step S15).

In a case where the number of pieces of command information received by the terminal device 101 is the same as the previous number (step S11: Yes), the control unit 12 determines that the cars are not divided or joined in the train composition 500 (step S16). Furthermore, in a case where the number of pieces of command information is increased in units of train composition (step S14: No), the control unit 12 determines that the cars are not divided or joined in the train composition 500 because the number of pieces of command information is not reduced or increased in units of train composition (step S16).

Here, hardware configurations of the terminal devices 101 to 116 and 201 to 216 will be described. Since the terminal devices 101 to 116 and 201 to 216 have the similar configurations, the terminal device 101 will be described as an example. In the terminal device 101, the transmission-reception unit 11 is realized by an interface circuit which can transmit and receive the command information via wired communication. The storage unit 13 is realized by a memory. The control unit 12 is realized by a processing circuit. That is, the terminal device 101 includes a processing circuit for determining whether the command information is normal or abnormal and for determining the command information to be adopted based on the priority of the central device. The processing circuit may be a Central Processing Unit (CPU) for executing a program stored in the memory, a memory, or dedicated hardware.

Figure 7:
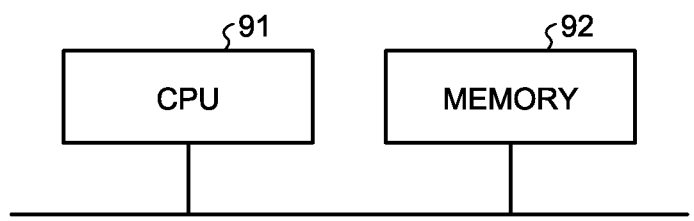
FIG. 7 is a diagram illustrating an example in a case where a processing circuit being a control unit of the terminal device is configured by a CPU and a memory.

FIG. 7 is a diagram illustrating an example in a case where the processing circuit which is the control unit 12 of the terminal device 101 according to the embodiment includes a CPU and a memory. In a case where the processing circuit includes a CPU 91 and a memory 92, each function of the control unit 12 of the terminal device 101 is realized by software, firmware, or a combination of software and firmware. The software and the firmware are written as a program and stored in the memory 92. In the processing circuit, the CPU 91 reads out and executes the program stored in the memory 92 to realize each function. That is, the control unit 12 of the terminal device 101 includes the memory 92 for storing the program with which a step of determining whether the command information is normal or abnormal and a step of determining the command information to be adopted based on the priority of the central device are executed as a result when the program is executed by the processing circuit. Furthermore, it can be said that these programs makes a computer execute a procedure and a method of the control unit 12 of the terminal device 101. Here, the CPU 91 may be a processing device, an operation device, a microprocessor, a microcomputer, a processor, a Digital Signal Processor (DSP) or the like. Furthermore, the memory 92 is, for example, a non-volatile or volatile semiconductor memory such as a Random Access Memory (RAM), a Read Only Memory (ROM), a flash memory, an Erasable Programmable ROM (EPROM), and an Electrically EPROM (EEPROM), a magnetic disk, a flexible disk, an optical disk, a compact disk, a mini disk, or a Digital Versatile Disc (DVD). Note that the storage unit 13 may be realized by the memory 92.

Figure 8:
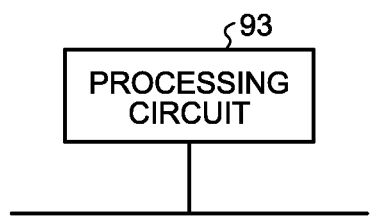
FIG. 8 is a diagram illustrating an example in a case where the processing circuit being the control unit of the terminal device is configured by dedicated hardware.

FIG. 8 is a diagram illustrating an example in a case where a processing circuit which is the control unit 12 of the terminal device 101 includes dedicated hardware according to the embodiment. In a case where the processing circuit is dedicated hardware, a processing circuit 93 illustrated in FIG. 8 is, for example, a single circuit, a composite circuit, a programmed processor, a parallel-programmed processor, an Application Specific Integrated Circuit (ASIC), a Field-Programmable Gate Array (FPGA), or a combination thereof. Functions of the control unit 12 of the terminal device 101 may be realized by the processing circuit 93 for each function, and the functions may be collectively realized by the processing circuit 93.

Each function of the control unit 12 of the terminal device 101 may be partially realized by dedicated hardware and may be partially realized by software or firmware. In this way, the processing circuit can realize each function by dedicated hardware, software, firmware, or a combination thereof.

Although the hardware configuration of the terminal device 101 has been described, the central devices 301 to 304 and 401 to 404 can be described as the similar configuration. When the central device 301 is described as an example, the transmission-reception unit 31 and the storage unit 33 are respectively realized by similar configurations to the configurations of the transmission-reception unit 11 and the storage unit 13 described above. The control unit 32, the command information generation unit 34, and the management information exchange unit 35 of the central device 301 are realized by the processing circuit illustrated in FIG. 7 or FIG. 8.

As described above, according to the present embodiment, in the train information management system 600a, each of the central devices 301 to 304 and 401 to 404 periodically transmits the command information. When receiving the command information from the plurality of central devices, the terminal devices 101 to 116 and 201 to 216 and the central devices 301 to 304 and 401 to 404 determine whether the command information is normal or abnormal. In a case where there are a plurality of pieces of normal command information, the command information transmitted from the central device with the highest priority is adopted. As a result, in a case where the train information management system 600a includes a central device which transmits the command information including invalid management information, a normal train operation can be continued.

The structures illustrated in the above embodiment indicate exemplary contents of the present invention and can be combined with other known technique. Further, the structures illustrated in the embodiment can be partially omitted and changed without departing from the scope of the present invention.

REFERENCE SIGNS LIST 11, 31 transmission-reception unit; 12, 32 control unit; 13, 33 storage unit; 34 command information generation unit; 35 management information exchange unit; 101 to 116, 201 to 216 terminal device; 301 to 304, 401 to 404 central device; 500, 501 train composition; 600, 600a train information management system.

The invention claimed is:

1. A terminal device to receive command information from a central device in a train information management system, the terminal device comprising:
    a transmission-reception unit, including an interface circuit, that (i) transmits and receives the command information to and from the central device or an adjacent terminal device, and (ii) periodically receives command information from a plurality of central devices;
    a memory that stores information on priorities set to the plurality of central devices;
    a controller including a central processing unit (CPU), said controller:
        determines whether management information, included in the command information received from the plurality of central devices, is normal command information or abnormal command information;
        determines, in response to receiving normal command information from more than one central device from the plurality of central devices, command information to be adopted based on a priority set to the central device that is the transmission source; and reduces a processing load by excluding, from adoption candidates, command information received from a central device that is determined, by the controller of the terminal device, to be abnormal command information, wherein abnormal command information includes management information in which a train number and/or a mileage is not set.

2. The terminal device according to claim 1, wherein in a case where there are a plurality of pieces of normal command information, the controller adopts normal command information transmitted from a central device with the highest priority among the central devices that have transmitted the normal command information.

3. The terminal device according to claim 1, wherein the controller determines command information to which the train number or the mileage, or train number and mileage are set as the management information among the received command information as normal command information.

4. The terminal device according to claim 1, wherein in a case where cars are divided or joined to the other train composition in the train composition including a car to which the terminal device is mounted, the controller cancels exclusion from the adoption candidates when there is a central device that has excluded from the adoption candidates of the command information.

5. The terminal device according to claim 4, wherein the controller detects that the cars are divided or joined to the other train composition based on the number of pieces of received command information.

6. A central device to transmit command information to the terminal device according to claim 1 in a train information management system, the central device comprising:

a command information generation unit, including a central processing unit (CPU), to periodically generate the command information;

a transmission-reception unit, including an interface circuit, to transmit the command information generated by the command information generation unit to the terminal device or the other central device and receives command information generated by the other central device directly or via the terminal device;

a controller including a function similar to the function of the controller of the terminal device according to claim 1; and a memory to store information on priorities set to the plurality of central devices.

7. The central device according to claim 6, further comprising:

a management information exchange unit, including a central processing unit (CPU), to exchange management information set to the command information with the other central device in the same car, wherein in a case where the management information set to the command information has an abnormality, the command information generation unit generates the command information by using the management information obtained by the management information exchange unit.

8. A train information management system comprising:

the terminal devices according to claim 1 mounted on all train compositions or in intermediate cars except for a leading car and a last car in the train composition; and central devices mounted on the leading car and the last car, each central device comprising:

a command information generation unit, including a central processing unit (CPU), to periodically generate the command information;

a transmission-reception unit, including an interface circuit, to transmit the command information generated by the command information generation unit to the terminal device or the other central device and receives command information generated by the other central device directly or via the terminal device;

a controller including a function similar to the function of the controller of the terminal device according to claim 1; and a memory to store information on priorities set to the plurality of central devices.

9. The train information management system according to claim 8, wherein all the cars or the intermediate cars include the terminal devices as many as the number of systems included in the train information management system, and the leading car and the last car include the central devices as many as the number of systems.

10. A train information management method of a terminal device to receive command information from a central device and a central device that receives command information from the other central device in a train information management system, the method comprising:

receiving, by a transmission-reception unit of the terminal device, the command information, said transmission-reception unit including an interface circuit;

storing, in a memory of the terminal device, information on priorities set to the plurality of central devices;

determining, by a controller of the terminal device, whether management information included in command information received from the plurality of central devices, is normal command information or abnormal command information, wherein said controller includes a central processing unit (CPU);

in response to receiving normal command information from more than one central device from the plurality of central devices, determining, by the controller, command information to be adopted based on a priority set to the central device that is the transmission source; and reducing a processing load by excluding, by the controller, from adoption candidates, command information received from a central device that is determined, by the controller of the terminal device, to be abnormal command information, wherein the abnormal command information includes management information in which a train number and/or a mileage is not set.

* * * * *